United States Patent
Tamper et al.

(10) Patent No.: US 9,441,052 B2
(45) Date of Patent: Sep. 13, 2016

(54) METHOD AND A SYSTEM FOR MANUFACTURING CELLULOSIC MATERIAL

(75) Inventors: Juha Tamper, Taipalsaari (FI); Markus Nuopponen, Helsinki (FI); Harri Kosonen, Lappeenranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 83 days.

(21) Appl. No.: 14/126,481

(22) PCT Filed: Jun. 13, 2012

(86) PCT No.: PCT/FI2012/050589
§ 371 (c)(1),
(2), (4) Date: Dec. 16, 2013

(87) PCT Pub. No.: WO2012/172170
PCT Pub. Date: Dec. 20, 2012

(65) Prior Publication Data
US 2014/0114059 A1   Apr. 24, 2014

(30) Foreign Application Priority Data
Jun. 15, 2011  (FI) ...................... 20115597

(51) Int. Cl.
| | |
|---|---|
| *C08B 37/00* | (2006.01) |
| *C08B 1/08* | (2006.01) |
| *C08B 11/12* | (2006.01) |
| *D21C 9/00* | (2006.01) |
| *D21H 11/18* | (2006.01) |
| *D21H 11/20* | (2006.01) |

(52) U.S. Cl.
CPC ............ *C08B 37/0003* (2013.01); *C08B 1/08* (2013.01); *C08B 11/12* (2013.01); *D21C 9/004* (2013.01); *D21C 9/005* (2013.01); *D21C 9/007* (2013.01); *D21H 11/18* (2013.01); *D21H 11/20* (2013.01); *C08L 2205/16* (2013.01)

(58) Field of Classification Search
CPC .................................................. C08B 37/0003
USPC .................................................. 536/127, 124
See application file for complete search history.

(56) References Cited

U.S. PATENT DOCUMENTS

| | | |
|---|---|---|
| 3,088,943 A | 5/1963 | Cordrey et al. |
| 2003/0083491 A1 | 5/2003 | Komen et al. |
| 2005/0215778 A1 | 9/2005 | Loth et al. |
| 2006/0020126 A1 | 1/2006 | Kopesky et al. |
| 2010/0024998 A1* | 2/2010 | Wildlock ............... D21H 11/18 162/124 |
| 2011/0046365 A1 | 2/2011 | Mikkonen et al. |
| 2012/0283363 A1* | 11/2012 | Kumamoto et al. ............ 524/35 |

FOREIGN PATENT DOCUMENTS

| | | |
|---|---|---|
| FR | 2 789 994 A1 | 8/2000 |
| GB | 866334 | 4/1961 |
| GB | 2 284 421 A | 6/1995 |
| WO | 95/15342 A1 | 6/1995 |
| WO | WO 2010/096742 A2 | 8/2010 |
| WO | WO 2011/051882 A1 | 5/2011 |
| WO | WO 2012/007363 A1 | 1/2012 |
| WO | 2012/064741 A2 | 5/2012 |

OTHER PUBLICATIONS

Eyholzer et al (Cellulose, vol. 17, pp. 19-30, (2010)).*
International Search Report issued in International Patent Application No. PCT/FI2012/050589 dated Nov. 16, 2012.
Jan. 27, 2015 Extended European Search Report issued in Application No. 12801299.4.

* cited by examiner

*Primary Examiner* — Patrick Lewis
*Assistant Examiner* — Everett White
(74) *Attorney, Agent, or Firm* — Oliff PLC (57) ABSTRACT

A method for manufacturing cellulosic material includes: introducing cellulose fibers as cellulosic raw material to a system, conveying the cellulose fibers to an extruder comprising a mixing part and/or a refining part, dosing at least one chemical to the system before the extruder and/or in the extruder and performing a reaction between the cellulose fibers and the chemical(s) at least partly in the extruder, wherein the reaction is performed at a consistency of at least 40%, and/or dosing at least one chemical to the system before the extruder and/or in the extruder and mixing the cellulose fibers and the chemical(s) in the mixing part of the extruder, wherein the mixing step is performed at a consistency of at least 40%, and/or refining the introduced cellulose fibers at least partly in the refining part of the extruder, wherein the refining step is performed at a consistency of at least 5%.

12 Claims, 4 Drawing Sheets

METHOD AND A SYSTEM FOR MANUFACTURING CELLULOSIC MATERIAL

FIELD OF THE INVENTION

This invention relates to a method and a system for manufacturing cellulosic material. The invention further relates to use of the produced cellulosic material in the manufacture of fibril cellulose pulp.

BACKGROUND OF THE INVENTION

Cellulose, which is an abundant natural raw material, is a polysaccharide consisting of a linear chain of several hundreds to ten thousand linked D-glucose units. Cellulose fibers can be refined with a refiner or a grinder to produce cellulosic material. The production of cellulosic material, especially when the produced pulp includes fibril cellulose, requires a significant amount of beating energy. Therefore, there may be an efficiency problem with the cellulosic material production.

Due to the above mentioned problem, it is found to be beneficial to add some compounds to increase the efficiency of the refining stage of the cellulosic material production. Cellulose fibers can be reacted, for example, with monochloroacetic acid or a salt thereof in an aqueous alkaline solution to produce lightly carboxymethylated cellulose. However, there is still a need for a new solution for increasing the efficiency of the cellulosic material production.

SUMMARY OF THE INVENTION

The present invention discloses a new solution for manufacturing cellulosic material. A method for manufacturing cellulosic material comprises at least the following:
  introducing cellulose fibers to a system, and
  conveying the cellulose fibers to an extruder.

The inventors of the present invention have surprisingly found a way to produce cellulosic material with an increased production efficiency. In the method, it is possible to use cellulose fibers as a raw material and to treat said cellulose fibers in the extruder, preferably with certain chemicals, to achieve cellulosic material.

According to an advantageous embodiment of the invention, the method comprises:
  introducing cellulose fibers to a system,
  conveying the cellulose fibers to an extruder,
  dosing at least one chemical to the system before the extruder and/or in the extruder, and
  performing a reaction between the cellulose fibers and the chemical(s) at least partly in the extruder, wherein the reaction is performed at a consistency of at least 40%.

According to another advantageous embodiment of the invention, the method comprises:
  introducing cellulose fibers to a system,
  conveying the cellulose fibers to an extruder comprising a mixing part,
  dosing at least one chemical to the system before the extruder and/or in the extruder, and
  mixing the cellulose fibers and the chemical(s) in the mixing part of the extruder, wherein the mixing step is performed at a consistency of at least 40%

According to another advantageous embodiment of the invention, the method comprises:
  introducing cellulose fibers to a system,
  conveying the cellulose fibers to an extruder comprising a refining part, and
  refining the introduced cellulose fibers at least partly in the refining part of the extruder, wherein the refining step is performed at a consistency of at least 5%.

According to an advantageous embodiment of the invention, the system comprises:
  means for introducing cellulose fibers to the system,
  an extruder,
  a conveyer for conveying the cellulose fibers to the extruder,
  means for dosing at least one chemical to the system before the extruder and/or in the extruder, and
  means for performing a reaction between the cellulose fibers and the chemical(s) at least partly in the extruder.

According to another advantageous embodiment of the invention, the system comprises:
  means for introducing cellulose fibers to the system,
  an extruder,
  a conveyer for conveying the cellulose fibers to the extruder,
  means for dosing at least one chemical to the system before the extruder and/or in the extruder, and
  a mixing part of the extruder for mixing the cellulose fibers and the chemical(s).

According to another advantageous embodiment of the invention, the system comprises:
  means for introducing cellulose fibers to the system,
  an extruder,
  a conveyer for conveying the cellulose fibers to the extruder, and
  a refining part of the extruder for refining the cellulose fibers.

According to yet another advantageous embodiment of the invention, the system comprises at least one prerefiner in order to refine the cellulose fibers, which prerefiner is placed before the extruder.

The extruder used in the invention may make it possible
  to increase the refining efficiency,
  to achieve a good mixing effect for the mixture,
  to increase the pressure used in the process,
  to increase the temperature used in the process (mainly due to the increased pressure),
  to achieve more efficient drying process of the fibers,
  to use some supplementary part(s) of the extruder, such as means to increase the pressure, in order to increase the production efficiency, and/or
  to implement reactions between the chemicals and the fibers.

According to an advantageous embodiment, cellulose fibers are reacted with a carboxymethylating agent in order to form a lightly carboxymethylated cellulose having a degree of substitution such that it is not soluble in water. According to this advantageous embodiment of the invention, an auxiliary agent and monochloroacetic acid, for example sodium monochloroacetic acid, are absorbed into cellulose raw material, after which the cellulose raw material is allowed to react with the dosed chemicals in an extruder at a high dry matter content. The used cellulose raw material may comprise chemical pulp, for example wood pulp. The auxiliary agent used in this embodiment is preferably an alkalizing agent, most preferably sodium hydroxide.

The produced cellulosic material may be used, for example, in fibril cellulose manufacturing.

DESCRIPTION OF THE DRAWINGS

In the following, the invention will be illustrated by drawings in which.

DETAILED DESCRIPTION OF THE INVENTION

The following reference numbers are used in this application:

| | |
|---|---|
| 1 | cellulose pulp raw material, i.e. cellulose fibers, |
| 2 | a prerefiner, |
| 3 | a first chemical inlet, |
| 5 | a feeding chest 5, |
| 6 | an extruder, |
| 6a 6b | a chemical mixing part, |
| 6c | a heating part, |
| 6d | a refining part, |
| 6e | a finishing part, |
| 7 | a second chemical inlet, |
| 8 | a refiner, |
| 9 | a washing treatment, a washing stage, |
| 9a | a dilution step, |
| 9b | a drying step, for example, a filtrating step and/or a pressing step, |
| 10 | a finishing device. |

The term "cellulose raw material" refers to any cellulose raw material source that can be used in the production of chemically and/or mechanically treated cellulose fibers. The raw material can be based on any plant material that contains cellulose. The plant material may be wood. The wood can be from softwood trees such as spruce, pine, fir, larch, douglas-fir or hemlock, or from hardwood trees such as birch, aspen, poplar, alder, eucalyptus or acasia, or from a mixture of softwood and hardwood. Nonwood material can be from agricultural residues, grasses or other plant substances such as straw, leaves, bark, seeds, hulls, flowers, vegetables or fruits from cotton, corn, wheat, oat, rye, barley, rice, flax, hemp, manila hemp, sisal hemp, jute, ramie, kenaf, bagasse, bamboo or reed.

The terms "chemically treated cellulose fibers" and "chemical cellulose pulp" refer to cellulose fibers, which are isolated from any cellulose raw material by a chemical pulping process. Therefore, the lignin is at least for the most part removed from the cellulose raw material. Chemical cellulose pulp is preferably sulfate wood pulp. The used chemical cellulose pulp may be unbleached or bleached. Typically, the diameter of the fibers varies from 15 to 25 µm and the length exceeds 500 µm, but the present invention is not intended to be limited to these parameters. The cellulose fibers used in this invention preferably comprises mechanically and/or chemically treated cellulose fibers.

The term "cellulosic material" refers to a material produced from cellulose fibers.

The term "high dry matter content" refers to a consistency of at least 40%.

The term "fibril cellulose" refers to a collection of isolated cellulose microfibrils or microfibril bundles derived from cellulose raw material. There are several widely used synonyms for fibril cellulose. For example: nanofibrillated cellulose (NFC), nanocellulose, microfibrillar cellulose, nanofibrillar cellulose, cellulose nanofiber, nano-scale fibrillated cellulose, microfibrillated cellulose (MFC), or cellulose microfibrils. Fibril cellulose described in this application is not the same material as the so called cellulose whiskers, which are also known as: cellulose nanowhiskers, cellulose nanocrystals, cellulose nanorods, rod-like cellulose microcrystals or cellulose nanowires. In some cases, similar terminology is used for both materials, for example by Kuthcarlapati et al. (Metals Materials and Processes 20(3): 307-314, 2008) where the studied material was called "cellulose nanofiber" although they clearly referred to cellulose nanowhiskers. Typically these materials do not have amorphous segments along the fibrillar structure as fibril cellulose, which leads to more rigid structure. Cellulose whiskers are also shorter than fibril cellulose. Characterization for the fibril cellulose is presented in the Table 1.

Viscosity of the fibril cellulose: There are several commercial Brookfield viscosimeters available for measuring apparent viscosity, which all based on the same principle. A low rotation speed is preferable, such as approximately 10 rpm, because higher rotational speed may give falsely high viscosity values. Attention should also be paid to obtain dilutions of fibril cellulose having constant standard concentration to be able to compare the results correctly. Further, it is preferably that flocking is avoided.

Turbidity of the fibril cellulose: Typically fibril cellulose is substantially transparent in an aqueous medium. More fibrillated cellulose materials have lower turbidity values when compared to less fibrillated ones. The units of turbidity from a calibrated nephelometer are called Nephelometric Turbidity Units (NTU). Suitably a fibril cellulose sample is diluted with water.

Charge of the fibril cellulose: Charge can be determined by conductometric titration, at concentration 0.8% by weight.

Yield Stress of the fibril cellulose: Yield stress can be measured at 1.5% concentration.

TABLE 1

Characterization for the fibril cellulose manufactured according to the invention

| Grade | Brookfield viscosity (mPas) | Turbidity (NTU) | Charge (ieq/g) | Yield Stress (Pa) |
|---|---|---|---|---|
| Anionic medium | 5000-10000 | 100-200 pref. 100-150 | between −200 and −400 | 4-12 Pref. 5-8 |
| Anionic premium | 15000-25000 | 50-100 pref. 60-80 | between −300 and −600 pref. between −350 and −500 | 8-30, Pref. 8-20 |

The term "TEMPO-treated" refers to a material that is treated with so called "TEMPO" chemical, i.e. 2,2,6,6-tetramethylpiperidinyl-1-oxy free radical. Characterization for the fibril cellulose manufactured from the TEMPO-treated cellulosic material is presented in the Table 2.

TABLE 2

Characterization for the fibril cellulose manufactured from the TEMPO-treated cellulosic material according to the invention

| Grade | Brookfield viscosity (mPas) | Turbidity (NTU) | Charge (ieq/g) | Yield Stress (Pa) |
|---|---|---|---|---|
| Anionic medium | 15000-30000 | 20-70 pref. 20-60 | between −900 and −1200 pref. between −1000 and −1100 | 10-30 Pref. 11-20 |

TABLE 2-continued

Characterization for the fibril cellulose manufactured from the TEMPO-treated cellulosic material according to the invention

| Grade | Brookfield viscosity (mPas) | Turbidity (NTU) | Charge (ieq/g) | Yield Stress (Pa) |
|---|---|---|---|---|
| Anionic premium | 30000-60000 | <20 pref. <15 | between −900 and −1200 pref. between −1000 and −1100 | 10-30 Pref. 8-12 |

Figure 1:
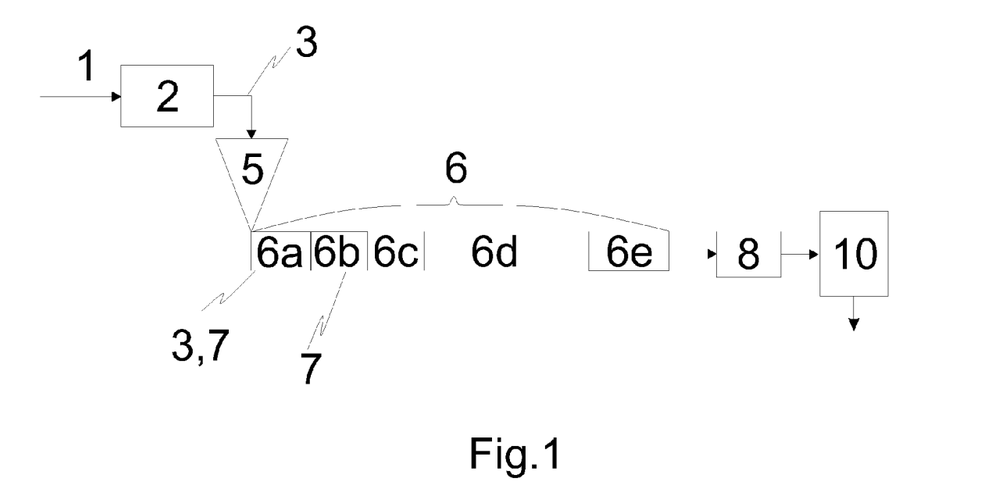
FIGS. 1-4 show example embodiments of the invention.
Figure 2:
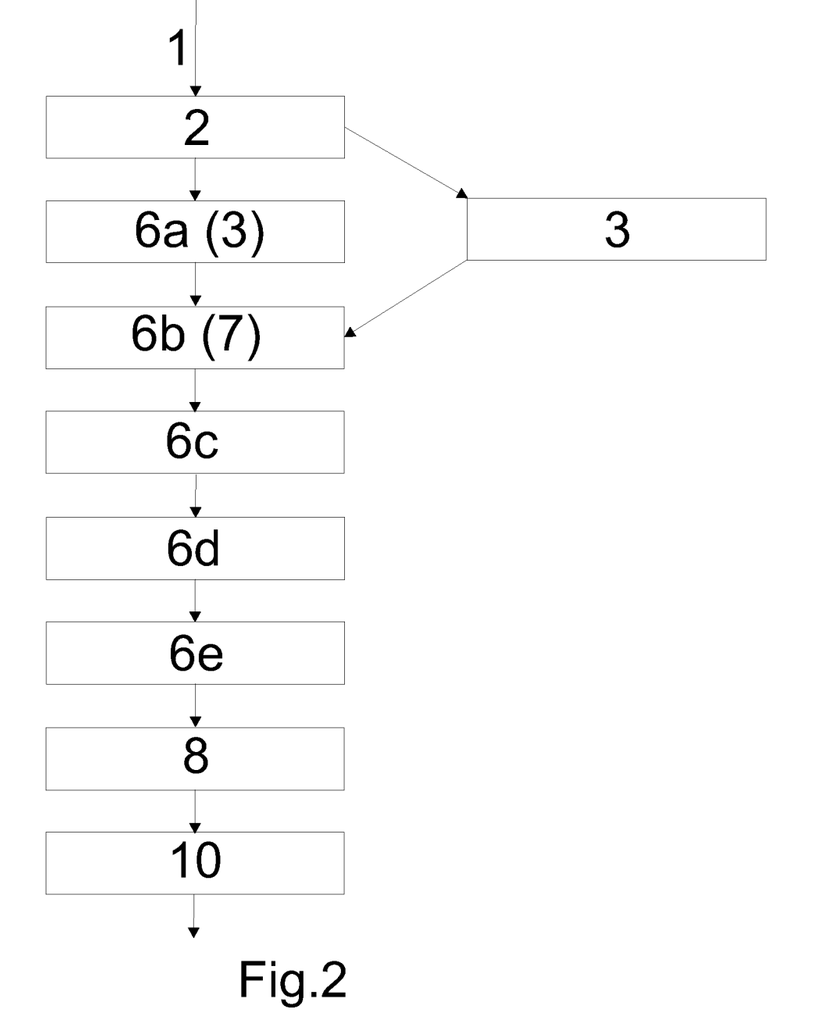
Figure 3:
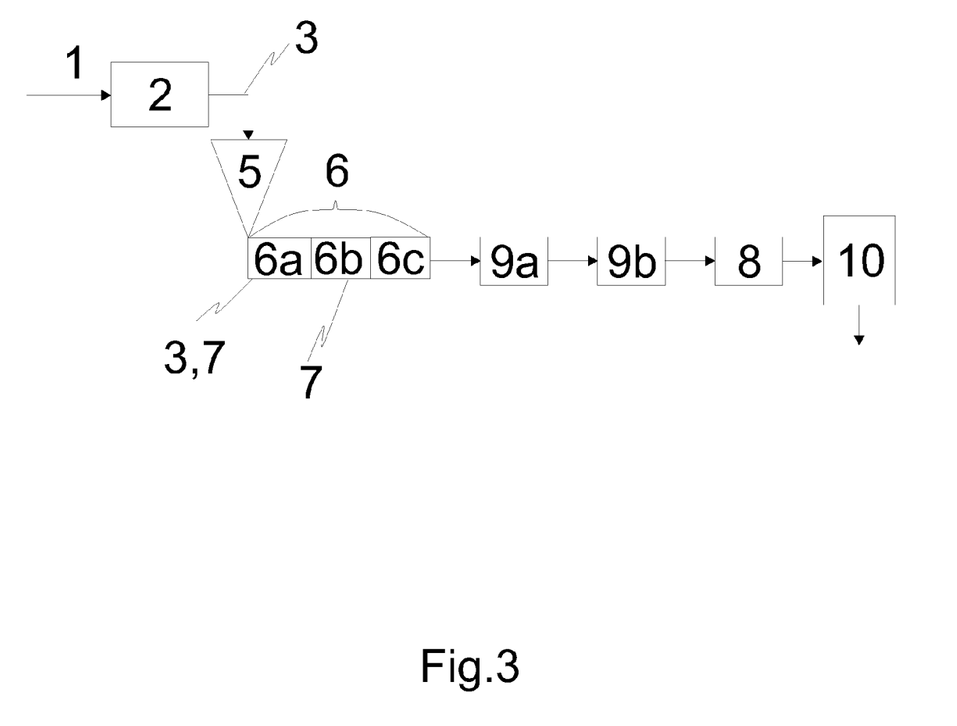
Figure 4:
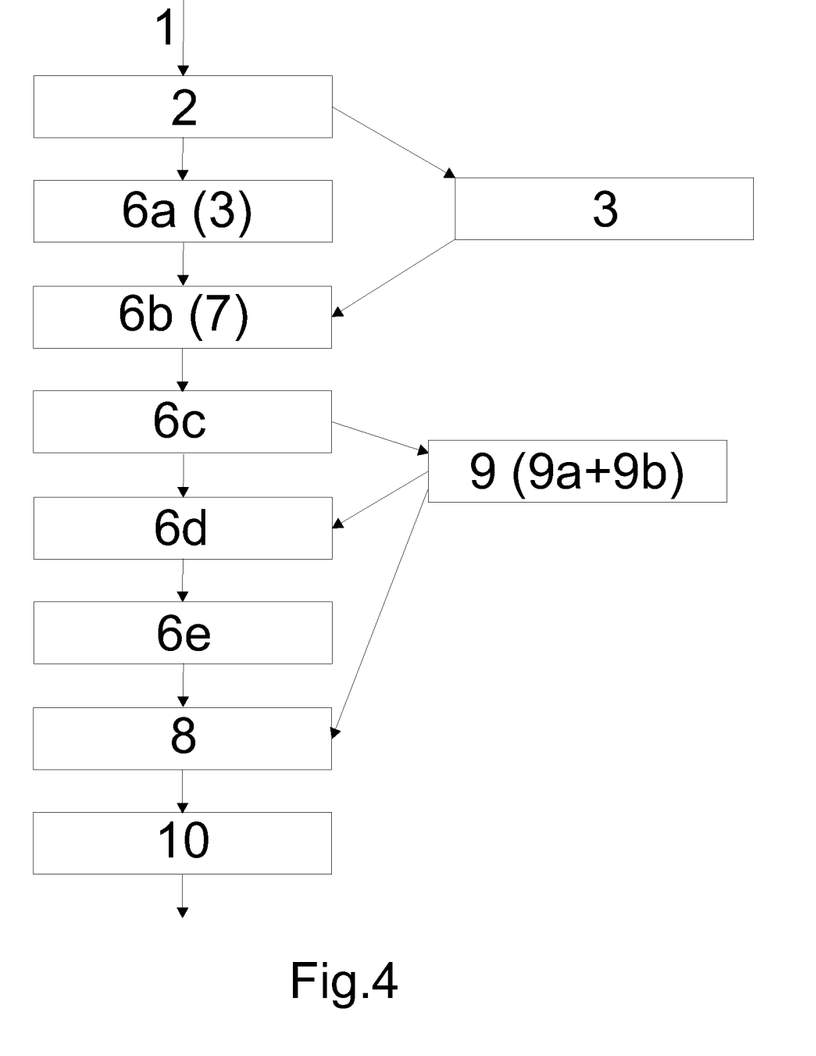

FIGS. 1 to 4 show some advantageous embodiments of the invention. Figures show the cellulose pulp raw material, i.e. cellulose fibers 1, a prerefiner 2, a first chemical inlet 3, a feeding chest 5, an extruder 6, a second chemical inlet 7, a refiner 8, a washing stage 9 and a finishing device 10. The extruder 6 may comprise several parts such as at least one chemical mixing part 6a, 6b, and/or a heating part 6c, and/or a refining part 6d, and/or a finishing part 6e of the extruder 6.

The cellulose fibers 1 used in the invention as a raw material can be supplied, for example, in the form of cellulose bales or cellulose rolls. However, other cellulose raw materials in fiber form can also be used. According to an advantageous embodiment of the invention, the cellulose raw material 1 comprises cellulose rolls. In that case, the amount of the produced cellulosic material can be controlled by the speed of unwinder(s) used for said rolls.

The cellulosic material process according to an embodiment of the invention has advantageously at least one prerefiner stage for prerefining the cellulose fibers 1. Therefore, according to an advantageous embodiment of the invention, the system comprises a prerefiner 2 which is used for a refining stage of the cellulose fibers 1, such as a cellulose bale or a roll of cellulose. According to an advantageous embodiment, the prerefiner 2 is placed before the extruder 6. The prerefining of the cellulose fibers can be carried out with a device capable of separate and/or shorter the cellulose fibers. The prerefiner device 2 is preferably a refiner such as a hammer mill, a fluffing machine, a rotary cutter or a disk refiner. If the cellulose raw material comprises cellulose bales, a bale breaker and/or fluffing machine may be preferably used. In the case of cellulose rolls, the prerefiner is preferably the hammer mill. Thanks to the prerefiner used, it is possible to increase the specific surface area of the cellulose pulp fibers for chemical-fiber reactions.

According to an advantageous embodiment, the method comprises a first chemical dosage in which the auxiliary agent is dosed to the system using the first chemical inlet 3 and absorbed into the cellulose raw material 1 before or during a second chemical dosage of another chemical. The auxiliary agent may be an alkali metal hydroxide, most preferably sodium hydroxide, and it is used for activating the pulp. In other words, auxiliary agent activates the fibers and contributes to the penetration of the second chemical into the fibers. The auxiliary agent can be added to the reaction mixture, for example, in an aqueous solution and/or in a dry state. The auxiliary agent may be dosed to the system using a nozzle spray technique, wherein the chemical is dosed as small drops, i.e. mist.

According to an advantageous embodiment of the invention, the dry matter content of the cellulose material 1 before the first chemical dosage is at least 40%, more preferably at least 50% or 60% or at least 70% and the most preferably at least 80% or at least 85%, including any and all ranges and sub ranges therein. Due to the high dry matter content, reactions with water or other liquid are mostly avoided. Therefore, the amount of the chemicals needed for the process is quite small. The chemical(s) is dosed into the cellulose in such a proportion that the dry matter content of the mixture after said dosing is at least 50%, more preferably at least 60% or at least 70% and the most preferably at least 80% or at least 85%, including any and all ranges and sub ranges therein.

According to an advantageous embodiment of the invention, the first chemical inlet 3 comprises at least one sprayer, preferably at least three or at least four sprayers. There are advantageously many inlets around the conveying pipe for cellulose material because, due to the high matter content of the used cellulose raw material 1, it may be the easiest way to mix the chemical and the cellulose raw material with each other during the dosage of the chemical.

The first chemical added to the system is preferably selected from the group comprising hydroxides and oxides, such as $Mg(OH)_2$, NaOH, LiOH and $Ca(OH)_2$ and CaO. The amount of the first chemical used may be, for example, between 2 and 20%, more preferably between 3 and 15% or between 4 and 8% from the used cellulose raw material.

According to an example embodiment, the first chemical is dosed in the extruder 6, preferably in the chemical mixing part 6a of the extruder. The first chemical can be added using the first chemical inlet 3 before the addition of the second chemical, or partly or wholly simultaneously with the addition of the second chemical.

According to an embodiment of the invention, the first chemical is sodium hydroxide and, for example, a solution of 15 to 100% aqueous sodium hydroxide is sprayed into the system as the first chemical.

The system according to the invention comprises preferably at least one feeding chest 5, after which the extruder 6 is placed. The feeding chest 5 may be part of the extruder 6. According to an example embodiment of the invention, the raw material 1 is conveyed via the feeding chest 5 to the extruder before it is treated with the second chemical. The feeding chest 5 is preferably a cyclone.

The dosing of the second chemical is preferably implemented before the extruder 6 or in the extruder 6. The extruder comprises at least one part, preferably more than one part. The extruder may comprise, for example, at least one chemical mixing part 6a, 6b and/or at least one heating part 6c and/or at least one refining part 6d and/or at least one finishing part 6e. In the extruder 6 the mixture comprising the cellulose fibers and liquid (water) is typically compressed, mixed and fibrillated. If at least one chemical is added, the dosed chemical(s) are capable of penetrating into the cellulose fibers. According to an advantageous embodiment of the invention, all or substantially all water used in the method is supplied together with the chemicals to be added to the system. According to an advantageous embodiment of the invention, the extruder comprises at least one mixing part 6a, 6b in order to achieve the required mixing effect on the pulp. The extruder may comprise several elements causing different kinds of mixing and refining effects. The rotation speed of the extruder 6 (at least the rotation speed of the mixing part and/or a refining part of the extruder) is preferably at least 600 rpm, at least 800 rpm or at least 1000 rpm.

The extruder 6 is preferably a twin screw extruder, for example a counter rotating twin screw and more preferably a co rotating twin screw. The extruder 6 may also be so called planetary extruder. The mixing part of the extruder advantageously comprises elements causing grinding-effects. The refining part of the extruder preferably comprises elements causing shearing effects.

According to an advantageous embodiment of the invention, the addition of at least one chemical is carried out in the extruder 6 or before the extruder 6. An absorption of the chemical into the cellulose fibers may be enhanced at least partly in the chemical mixing part 6a, 6b of the extruder 6. It is possible to add, for example, gaseous chemical(s) and/or to spray chemical(s) to the extruder 6 in at least one chemical mixing part 6a, 6b. The second chemical, i.e. the main chemical, added to the system is preferably selected from the following group:
- oxidizing chemicals,
- hydrogen peroxide,
- hypochlorite,
- cationization agents,
- additives, which do not form covalent bonds, such as CMCV,
- polymers, such as PEO/PEG The amount of the second chemical used may be, for example in case of sodium monochloroacetic acid, between 2 and 30%, preferably between 5 and 20% or between 10 and 15% from the used cellulose raw material.

According to an example embodiment of the invention, the temperature of at least one part of the extruder 6 can be controlled. In this case, the extruder preferably comprises a heating part 6c. Due to the thermal energy produced in the extruder and/or introduced in the system from the outside, the temperature of the mixture comprising cellulose fibers and water can be raised to such a level that the actual reaction can be started and at least partly performed in the heating part 6c of the extruder. The temperature of the mixture in the heating part 6c may be at least 60° C., preferably at least 80° C. The temperature of the mixture in the heating part 6c may be at most 220° C. or at most 180° C., preferably at most 150° C., at most 120° C. or at most 105° C. Some chemicals may require lower or higher temperature than the above said for a reaction with cellulose fibers.

According to an example embodiment of the invention, the consistency of the mixture can be controlled in the extruder. Therefore, the extruder 6 can also be used to add or to remove liquid(s) from the mixture. Removing of the liquid(s) can be carried out, for example, using vacuum technique.

The reaction between at least one chemical and cellulose fibers may be carried out in a mixture containing only a small amount of liquid. According to an example embodiment of the invention, the dry matter content of the mixture in the chemical mixing part 6a, 6b and/or in the heating part of the extruder is at least 20%, or at least 40%, preferably at least 60% or at least 80%. Said liquid advantageously comprises or consist of water.

According to an example embodiment of the invention, the reaction between at least one chemical and cellulose fibers is carried out between TEMPO-chemical and the cellulose fibers in the extruder in order to produce TEMPO-treated fibers as cellulosic material.

After the mixing step 6a, 6b and the heating step 6c in the extruder 6, the produced material is preferably washed to remove any excess chemical from the treated pulp. For the washing treatment 9, the pulp is first diluted 9a, preferably with water, after which the dry matter content of the produced material is increased 9b. This can be done, for example, by using a filtrating device, and/or a centrifugal apparatus, and/or a pressing device. Dilution 9a may be implemented in the extruder 6 or outside from the extruder 6. The consistency of the material during the dilution step is preferably between 2 and 10%. The process may comprise several washing treatment stages with the dilution step and the drying step within every stage. Preferably the process comprises 1 to 3 washing treatment stages. The washing treatment is preferably implemented before the possible refining treatment in the extruder 6c or outside from the extruder 6 in order to increase the refining efficiency. According to an example embodiment of the invention, the filtrate of the washing step 9 is collected and, preferably, recycled. The concentration of the chemical(s) in the filtrate may be increased and/or the filtrate may be cleaned before recycling.

According to an advantageous embodiment of the invention, the extruder 6 comprises a refining part 6d in order to refining cellulose material, preferably high consistency cellulose material. The consistency of the material in the refining part 6d of the extruder is preferably at least 5%, at least 15%, at least 25% or at least 30%. According to an example embodiment of the invention, a third chemical, for example CMC or at least one of the following chemicals:
- oxidizing chemicals,
- hydrogen peroxide,
- hypochlorite,
- cationization agents,
- additives, which do not form covalent bonds, such as CMCV, and
- polymers, such as PEO/PEG is added to the system before the refining part 6d or in the refining part 6d in order to increase the efficiency of the refining step. According to an example embodiment of the invention, the refining part 6d is used to refine the produced cellulosic material into fibril cellulose material.

According to an example embodiment of the invention, the extruder 6 is used for refining cellulose fibers which are treated with chemicals before they are introduced to the system.

According to an example embodiment of the invention, the extruder 6 comprises a drying part. The drying part is used to increase the dry matter content of the mixture comprising cellulose fibers.

The method according to an example embodiment of the invention comprises at least some of the following:
- Introducing cellulose fibers as raw material 1 to a system.
- Refining the cellulose fibers 1 with a prerefiner 2.
- Dosing a first chemical to the system before an extruder 6 and/or in the extruder 6 in order to absorb the dosed chemical into the cellulose fibers 1.
- Conveying the cellulose fibers 1 to the extruder 6, preferably via the feeding chest 5.
- Dosing the second chemical to the system before the extruder 6 and/or in the extruder 6 in order to absorb the second chemical into the cellulose fibers 1.
- Performing a reaction between the cellulose fibers and at least one chemical in order to produce cellulosic material. The reaction is performed preferably at the extruder 6 at a consistency of at least 40%, preferably at least 50%.
- Using the heating part 6c of the extruder 6 in order to achieve a predetermined reaction temperature, reaction time and/or retention temperature.
- Diluting the produced mixture. The dilution may be carried out in the extruder 6 or outside from the extruder 6. According to one aspect of the invention, the reaction of cellulose fibers with at least one chemical will be stopped due to the dilution stage.

Filtrating the mixture.

Refining the produced cellulosic material in a refining part 6d of the extruder 6.

Conveying the produced cellulosic material to a refiner 8 in order to refine the material after the extruder 6.

Refining the produced cellulosic material in a refiner 8.

Finishing steps 10 of the produced cellulosic material.

In some embodiments there may be at least two refining stages in the process. In this case, the extruder comprises preferably at least one of said refining stages.

In an aspect of the invention, the system comprises a refiner 8. There may be both, the refining part of the extruder and the additional refiner 8, or the refiner 8 may be used instead of the refining part of the extruder. The refiner 8 is preferably placed after the extruder 6. The refiner may be, for example, another extruder, or a disc refiner, or a conical refiner. In an aspect of the invention, the refiner 8 is a grinder, a homogenizer, a colloider, a friction grinder, a fluidizer or an ultrasound sonicator.

The cellulosic material production can be controlled by the quantity of said chemicals, by the degree of mechanical working and by the time used for the chemical reactions.

Due to the high dry matter content used in one embodiment of the process, it is possible to reduce the amount of the chemicals used and, thus, to reduce the chemical costs.

The functional properties of the produced carboxymethyl cellulose depend on the degree of substitution (DS) of the cellulose structure. According to an example embodiment of the invention, lightly carboxymethylated cellulose that is not soluble in water is produced according to the method of the invention. According to this embodiment of the invention, the produced lightly carboxymethylated cellulose has a degree of substitution preferably between 0.02 and 0.4 or between 0.04 and 0.3 carboxymethyl group per anhydroglucose unit, more preferably between 0.07 and 0.25 or between 0.10 and 0.22 carboxymethyl group per anhydroglucose unit. In this case, the second chemical may be monochloroacetic acid or a salt thereof, such as sodium monochloroacetic acid. It can be added to the system in a dry state and/or in an aqueous alkaline solution and/or in a gas form in order to produce carboxymethyl cellulose. According to an example embodiment, the temperature in the heating part 6c of the extruder 6 is kept between 50 and 120° C., and more preferably between 80 and 105° C. to allow the carboxymethylation reaction to take place in the extruder 6.

According to an advantageous embodiment of the invention, the produced cellulosic material comprises fibril cellulose pulp and/or is used as a raw material to produce fibril cellulose pulp.

If the produced cellulosic material is lightly carboxymethylated cellulose, it can be easily refined, for example, for the production of fibril cellulose. Therefore, due to the present invention, it is possible to lower the energy consumption, for example, in the fibril cellulose manufacturing process. In addition, the following refining stage may be even more efficient due to the washing stage of the produced pulp.

According to an example embodiment of the invention, the extruder 6 comprises a pelletization part in order to achieve pelletized cellulosic material. The pelletized cellulosic material may be easier to use and/or to treat afterwards. It is also possible in addition or instead of the pelletization, for example, to dry, refine, or put into bags the produced cellulosic material.

A person skilled in the art understands readily that the different embodiments of the invention may have applications in environments where optimization of the cellulosic material production is desired. Therefore, it is obvious that the present invention is not limited solely to the above-presented embodiments, but it can be modified within the scope of the appended claims.

The invention claimed is:

1. A method for manufacturing nanofibrillar cellulosic material, the method comprising:
introducing cellulose fibers as cellulosic raw material to a system, and
conveying the cellulose fibers to an extruder comprising a mixing part and optionally a refining part,
wherein the method further comprises:
dosing at least one first chemical comprising an alkalizing agent in an amount between 2 and 20% from the used cellulose raw material to the system before the extruder and/or in the extruder and performing a reaction between the cellulose fibers and the first chemical(s) at least partly in the extruder to activate the fibers, wherein the reaction is performed with a dry matter content of the cellulose material of at least 40%, and then
dosing at least one second chemical comprising a carboxymethylating agent in an amount between 2 and 30% from the used cellulose raw material to the system in the extruder and mixing the cellulose fibers and the second chemical(s) in the mixing part of the extruder, wherein the mixing step is performed with a dry matter content of the cellulose material of at least 40%,
heating the mixture to a temperature of at least 60° C., to produce a carboxymethylated cellulose having a degree of substitution between 0.02 and 0.4 carboxymethyl group per anhydroglucose unit, and
refining the cellulose fibers in order to form the nanofibrillar cellulose material.

2. The method according to claim 1, the method comprising:
dosing the first chemical before the extruder or in the mixing part of the extruder, and
dosing the second chemical in the mixing part of the extruder.

3. The method according to claim 2, wherein the first chemical is sodium hydroxide and the second chemical is monochloroacetic acid or a salt thereof.

4. The method according to claim 1, wherein the first and/or second chemical further comprises 2,2,6,6-tetramethylpiperidinyl-1-oxy (TEMPO) chemical and that the method comprises:
performing a reaction between the cellulose fibers and the TEMPO-chemical in the extruder in order to manufacture TEMPO-treated cellulosic material.

5. The method according to claim 1, the method comprising:
refining the cellulose fibers in a prerefiner before conveying the cellulose fibers to the extruder.

6. The method according to claim 1, wherein the extruder comprises a heating part and the method comprises:
using the heating part of the extruder in order to achieve a predetermined reaction temperature.

7. The method according to claim 6, wherein the temperature in the heating part is increased by a hot steam circulation.

8. The method according to claim 1, the method comprising:

diluting and filtrating the mixture comprising the cellulose fibers and the chemical(s) after the chemical mixing part of the extruder.

9. The method according to claim 1, the method comprising:
refining the produced cellulosic material after extruder in a refiner in order to refine the nanofibrillar cellulosic material.

10. The method according to claim 1, wherein the extruder comprises a drying part, and the method comprises:
increasing the dry matter content of the mixture in the extruder.

11. The method according to claim 1, wherein the heating of the mixture is to a temperature of at least 80° C.

12. The method according to claim 1, wherein in the refining, the dry matter content of the cellulose material is at least 5%.

* * * * *